United States Patent [19]
Alexander et al.

[11] Patent Number: 5,633,839
[45] Date of Patent: May 27, 1997

[54] MUSIC VENDING MACHINE CAPABLE OF RECORDING A CUSTOMER'S MUSIC SELECTIONS ONTO A COMPACT DISC

[76] Inventors: Gregory Alexander, 120 D Klein Creek Ct., Carol Stream, Ill. 60188; David L. Volk, 301 Oakwood Ct., Clairton, Pa. 15025; Steven D. Goldenbogen, 733 Broughton St., Pittsburgh, Pa. 15213

[21] Appl. No.: 602,461

[22] Filed: Feb. 16, 1996

[51] Int. Cl.$^6$ ............................................. G11B 17/22
[52] U.S. Cl. ............................. 369/30; 221/3; 369/34
[58] Field of Search ................................. 369/30, 32, 34, 369/36, 33, 47, 37, 38; 364/478, 479

[56] References Cited

U.S. PATENT DOCUMENTS

| | | | |
|---|---|---|---|
| 3,990,710 | 11/1976 | Hughes | 274/1 R |
| 4,674,055 | 6/1987 | Ogaki et al. | 364/479 |
| 4,703,465 | 10/1987 | Parker | 369/30 |
| 4,872,151 | 10/1989 | Smith | 369/14 |
| 4,937,807 | 6/1990 | Weitz et al. | 369/85 |
| 5,228,015 | 7/1993 | Arbiter et al. | 369/33 |
| 5,249,166 | 9/1993 | Hamilton et al. | 369/32 |
| 5,408,630 | 4/1995 | Moss | 395/425 |
| 5,415,319 | 5/1995 | Risolia | 221/3 |
| 5,418,763 | 5/1995 | Ichikawa et al. | 369/30 |
| 5,445,295 | 8/1995 | Brown | 221/3 |
| 5,523,551 | 6/1995 | Scott | 235/381 |

FOREIGN PATENT DOCUMENTS

| | | | |
|---|---|---|---|
| 57-168380 | 10/1982 | Japan | 369/30 |
| 58-163062 | 9/1983 | Japan | 369/30 |
| 291795 | 3/1990 | Japan | 369/30 |
| 3296193 | 12/1991 | Japan | 369/30 |

*Primary Examiner*—Tan Dinh
*Attorney, Agent, or Firm*—David L. Volk; Brendan B. Dix

[57] ABSTRACT

A microprocessor acts upon instructions received from a random access memory and a read only memory. A removable hard drive contains musical selections digitally stored thereon. The hard drive stores data in the random access memory and retrieves data from the random access memory as directed by the microprocessor. A monitor displays a list of available musical selections and a list of the customer's selections. A keyboard is used by the customer to provide input to the microprocessor. A card reader retrieves electronic information from a payment card and sends payment information to the microprocessor. A CD writer and dispenser is controlled by the microprocessor to retrieve a blank compact disk from a CD storage, record the customer's musical selections onto the compact disk, and dispense the compact disk.

2 Claims, 3 Drawing Sheets

MUSIC VENDING MACHINE CAPABLE OF RECORDING A CUSTOMER'S MUSIC SELECTIONS ONTO A COMPACT DISC

BACKGROUND

1. Field of Invention

This invention relates to an operator-actuated information retrieval system, specifically to an apparatus for recording a customer's music selections onto a compact disk.

2. Description of Prior Art

Currently, if a consumer wishes to own compact disk recordings of his or her favorite musical selections, he or she has several options, each of which has drawbacks. The first option is to buy the "album-sized" CD's, each of which typically contains 8 to 10 musical selections by the same performer. Even if the consumer is only interested in 1 or 2 of the songs on the CD, he or she must pay for all of the selections.

A second option is to buy the "single-sized" CD. This is a smaller CD containing only 1 or 2 selections. This option allows the consumer to better target his or her purchases to only those musical selections that he or she is interested in. The problem with these CD's is that the listening time is quite brief before the CD has to be manually changed, unless a more expensive CD player with a large capacity automatic changer is used. A second problem is that the availability and selection of these types of CD's is more limited than the album-sized CD.

A third option is to buy an expensive CD recording system, and to record his or her favorite hits off of the radio. This method requires a great deal of personal time, and results in less than satisfactory recordings including unwanted commercials or disc jockey voices, and partially cut-off songs.

A solution to these drawbacks would be to provide a compact disk vending system which produces a single compact disk containing several individual music selections made by a customer. Although compact disk recording systems and computer-controlled vending systems are currently available, there is presently no wholly integrated unit which combines the functions of these systems to produce compact disks containing a customer's musical selections.

SUMMARY

The compact disk vending system of the present invention includes a microprocessor which acts upon instructions received from a random access memory and a read only memory. A removable hard drive contains musical selections digitally stored thereon. The hard drive stores data in the random access memory and retrieves data from the random access memory as directed by the microprocessor.

A monitor displays a list of available musical selections and a list of the customer's selections. A keyboard is used by the customer to provide input to the microprocessor. A CD writer and dispenser is controlled by the microprocessor to retrieve a blank compact disk from a CD storage, record the customer's musical selections onto the compact disk, and dispense the compact disk.

The compact disk vending system permits a customer to purchase a compact disk containing his or her individual music selections. Because the keyboard includes several clearly labeled buttons and keys which initiate individual functions necessary to make selections, initiate recording of the compact disk and pay for the disk, the compact disk vending system is easy to use and requires only minimal printed instructions.

DETAILED DESCRIPTION

Figure 1:
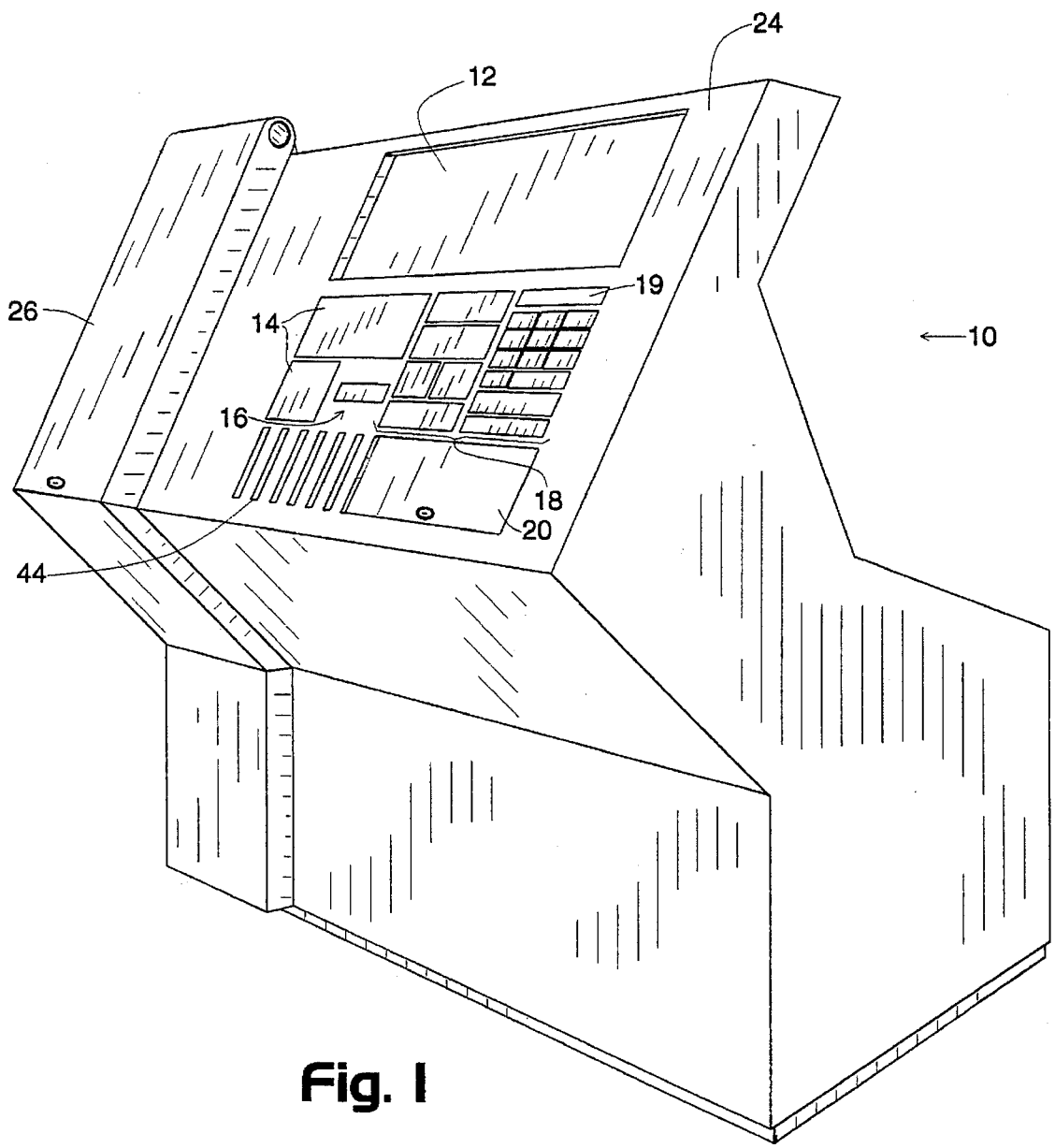
FIG. 1 is a perspective view of the compact disk vending system.

FIG. 1 is a perspective view of a compact disk vending system 10 having a customer-accessible face 24. A monitor 12, an instruction area 14, a payment section 16, a keyboard 18, a keyboard screen 19, a product access door 20 and a speaker grille 44 are each located on the face 24.

A service door 26 is located on the face 24. The service door 26 may alternatively be located on any accessible portion of the compact disk vending system 10.

Figure 2:
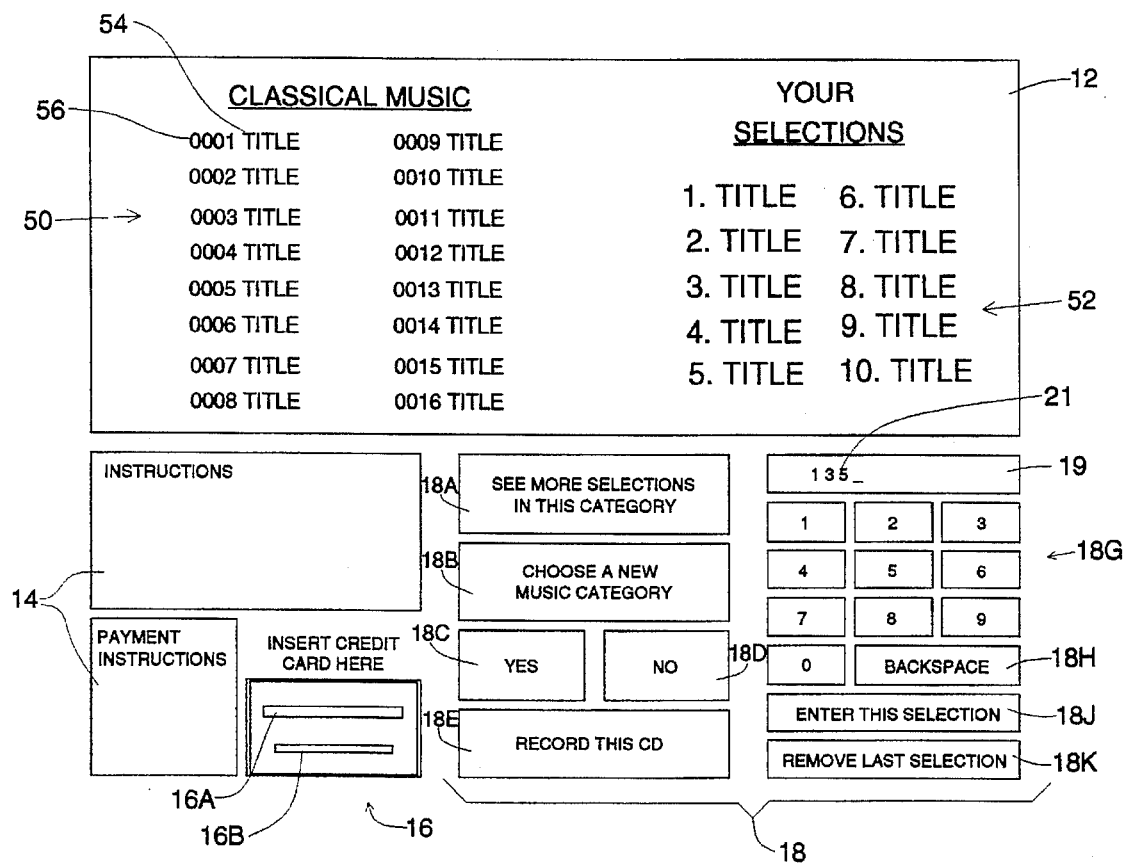
FIG. 2 is a front elevational view of one embodiment of the monitor, instruction, payment and keyboard sections of the compact disk vending system.

FIG. 2 is an elevational view of the monitor 12, the instruction area 14, the payment section 16, the keyboard 18 and the keyboard screen 19. The monitor 12 displays a list of available selections 50. The list of available selections 50 shows musical selections available in a music category. A title 54 and a code 56 is displayed for each musical selection. The monitor 12 also displays a list of customer selections 52. The list of customer selections 52 displays all of the musical selections made by the cutomer.

The instruction area 14 contains instructions (not shown) for the customer to use the compact disk vending system 10. The payment section 16 includes a card slot 16A and a receipt slot 16B.

The keyboard 18 includes a see more button 18A, a choose category button 18B, a yes button 18C, a no button 18D, a record this CD button 18E, numerical keys 18G, a backspace key 18H, an enter this selection key 18J and a remove last selection key 18K.

Figure 3:
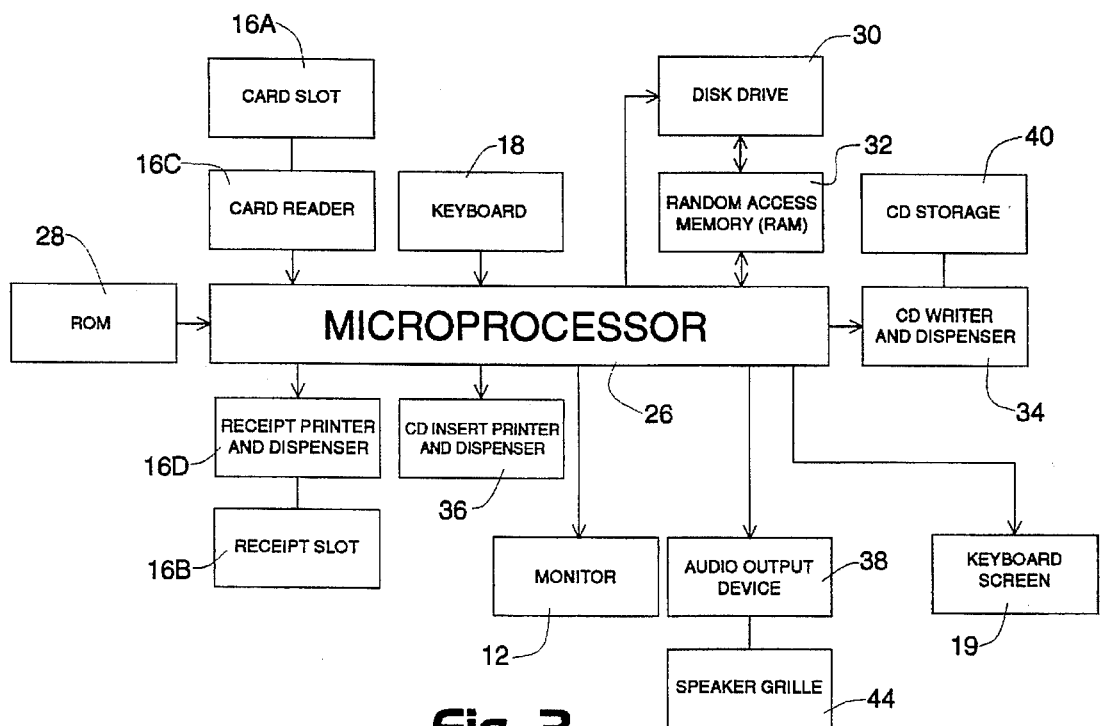
FIG. 3 is a block diagram of the compact disk vending system.

FIG. 3 is a block diagram of the compact disk vending system 10. The compact disk vending system 10 includes a microprocessor 26 which acts upon instructions received from a card reader 16C, the keyboard 18, a Random Access Memory or RAM 32 and a Read Only Memory or ROM 28 to control a disk drive 30, the monitor 12, the keyboard screen 19, an audio output device 38, a CD writer and dispenser 34, a CD insert printer and dispenser 36, and a receipt printer and dispenser 16D.

The disk drive 30 is a removable hard drive which contains digitally stored musical selections, the titles 54 of the musical selections, and software. The software assigns one of the codes 56 to each musical selection. The disk drive 30 stores data in the RAM 32 and retrieves data from the RAM 32 as directed by the microprocessor 26. Alternatively, the disk drive 30 may be a compact disk drive or a floppy disk drive. The disk drive 30 is located behind the service door 26.

Referring to FIGS. 1, 2 and 3, when the customer presses the see more button 18A, the list of available selections 50 shows additional musical selections in the currently displayed category.

When the customer presses the choose category button 18B, the list of available selections 50 shows musical selections in a new category.

When the customer presses the numerical keys 18G, numbers 21 corresponding to the numerical keys 18G pressed appear on the keyboard screen 19.

When the customer presses the backspace key 18H, the last number 21 appearing on the keyboard screen 19 is erased from the keyboard screen 19.

When the customer presses the enter this selection key 18J, the numbers 21 appearing on the keyboard screen 19 are compared by the microprocessor 26 to the codes 56 stored in the RAM 32. If the numbers 21 correspond to one of the codes 56 stored in the RAM 32, the title 54 of the musical selection corresponding to the code 56 appears on the list of customer selections 52 and the numbers 21 are erased from the keyboard screen 19. If the numbers 21 do not correspond to one of the codes 56, the numbers 21 remain on the keyboard screen 19 and an appropriate message may be displayed on the monitor 12 to notify the customer that no such selection is available.

When the customer presses the remove last selection key 18K, the last musical selection appearing on the list of customer selections 52 is removed.

When the customer presses the record this CD button 18E, a message prompting the customer to insert a payment card (not shown) appears on the monitor 12.

When the customer inserts the payment card into the card slot 16A, the card reader 16C retrieves the electronic information stored on the payment card and sends payment information to the microprocessor 26. The microprocessor 26 then directs the receipt printer and dispenser 16D to print a receipt (not shown) and to dispense the receipt through the receipt slot 16B. The microprocessor 26 then directs the CD writer and dispenser 34 to retrieve a blank compact disk (not shown) from a CD storage 40 and to record the customer's selections onto the compact disk and to dispense the disk into an area (not shown) behind the product access door 20. The microprocessor 26 then directs the CD insert printer and dispenser to print the titles 54 of the customer's selections on a paper compact disk insert (not shown), and to dispense the insert into the area behind the product access door 20.

The microprocessor 26 directs the audio output device 38 to generate various sounds to signal the appropriateness or inappropriateness of a button press by the customer. The audio output device 38 is located behind the speaker grille 44. The audio output device 38 includes an amplifier (not shown) and a speaker (not shown).

The yes button 18C and the no button 18D may be used by the customer to enter responses to prompts (not shown) which may appear on the monitor 12. The prompts may include requests for the customer to confirm his or her intent. For example, the prompt, "Are you sure you wish to record the CD now? Press Yes or No", may appear after the record this CD button 18E has been pressed.

Figure 4:
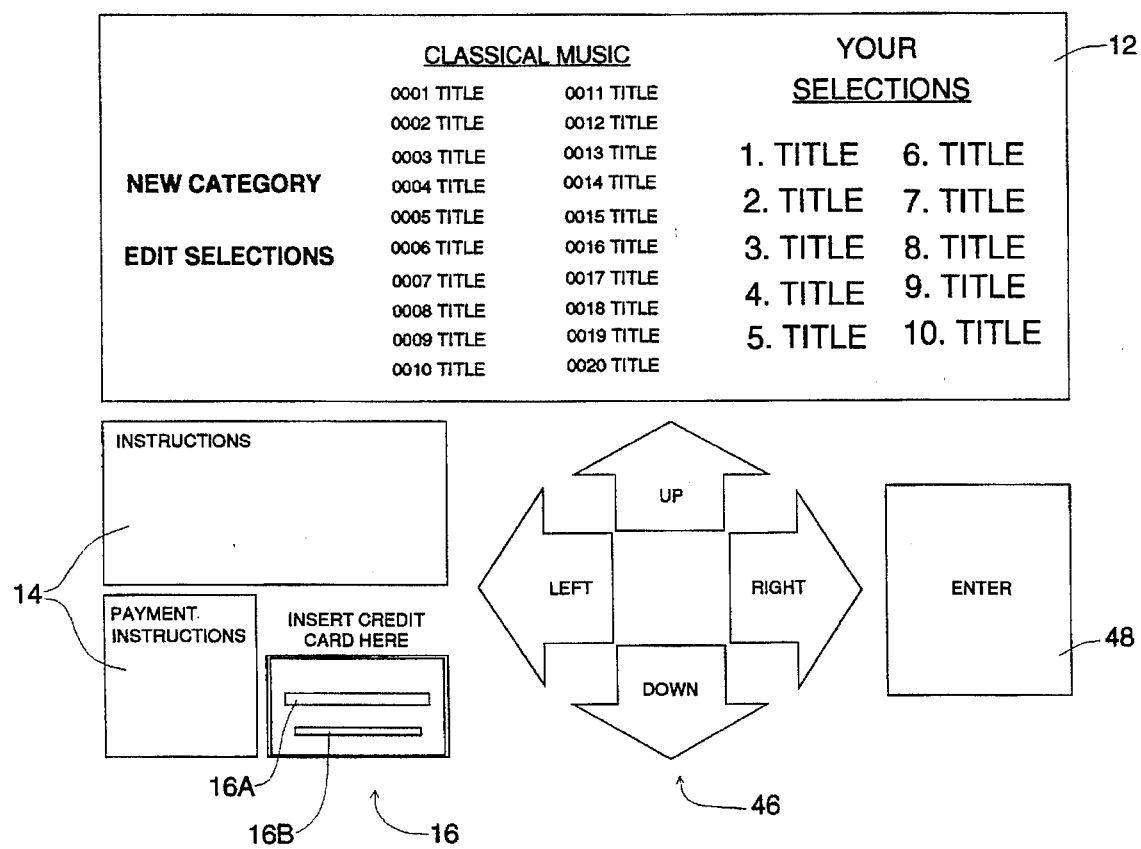
FIG. 4 is from elevational view of another embodiment of the monitor, instruction, payment and keyboard sections of the compact disk vending system.

The customer interface with the compact disk vending system 10 may vary from the forgoing description. For example, FIG. 4 shows an alternative embodiment of the keyboard 18, wherein the keyboard 18 includes cursor keys 46 and an enter key 48. The customer highlights various items displayed on the monitor 12 by pressing the cursor keys 46. The customer indicates his or her intent by pressing the enter key 48 when the desired item is highlighted.

CONCLUSION, RAMIFICATIONS AND SCOPE

Thus the compact disk vending system of the present invention permits a customer to purchase a compact disk containing his or her individual music selections. Because the keyboard of the first embodiment includes several clearly labeled buttons and keys which initiate individual functions necessary to make selections, initiate recording of the compact disk and pay for the disk, the compact disk vending system is easy to use and requires only minimal printed instructions.

While the above description contains many specificities, these should not be construed as limitations on the scope of the invention, but rather as an exemplification of one preferred embodiment thereof. Many variations are possible.

Accordingly, the scope of the invention should be determined not by the embodiment illustrated, but by the appended claims and their legal equivalents.

The invention claimed is:

1. A compact disk vending system for recording a customer's musical selections onto a compact disk, said compact disk vending system comprising:

a. a removable hard drive having available musical selections and titles of said available musical selections and codes for each of said available musical selections digitally stored thereon;
  b. a microprocessor;
  c. a random access memory;
  d. said removable hard drive storing data in said random access memory as directed by said microprocessor, said removable hard drive retrieving data from said random access memory as directed by said microprocessor;
  e. a read only memory;
  f. said microprocessor acting upon instructions received from said random access memory and said read only memory;
  g. a customer-accessible face;
  h. a monitor on said face, said monitor controlled by said microprocessor, said monitor displaying a list of said available musical selections, said monitor displaying a list of the customer's musical selections;
  i. a keyboard on said face, said keyboard providing input to said microprocessor;
  j. said keyboard comprising a choose category button, said choose category button when pressed directing said microprocessor to control said monitor to display said available musical selections in a new category;
  k. said keyboard comprising numerical keys;
  l. a keyboard screen on said face, said keyboard screen displaying numbers corresponding to said numerical keys when said numerical keys are pressed;

m. said keyboard comprising an enter this selection key, said enter this selection key when pressed directing said microprocessor to compare said numbers displayed on said keyboard screen to said codes and to add said available musical selection corresponding to said code to said list of the customer's musical selections;

n. said keyboard comprising a remove last entry key;

o. said remove last entry key when pressed directing said microprocessor to remove the last of the customer's musical selections from said list of the customer's musical selections;

p. said keyboard comprising a record this CD button, said record this CD button when pressed directing said microprocessor to control said monitor to display a message prompting the customer to insert a payment card;

q. a card reader for retrieving electronic information from said payment card, said card reader inputting said information to said microprocessor;

r. a CD storage;

s. a CD writer and dispenser;

t. said CD writer and dispenser controlled by said microprocessor to retrieve a blank compact disk from said CD storage, record the customer's musical selections on said compact disk, and dispense said compact disk when said information from said payment card is received by said microprocessor.

2. The compact disk vending system of claim 1, further comprising a payment means for accepting the customer's payment and sending payment information to said microprocessor.

* * * * *